2,945,970

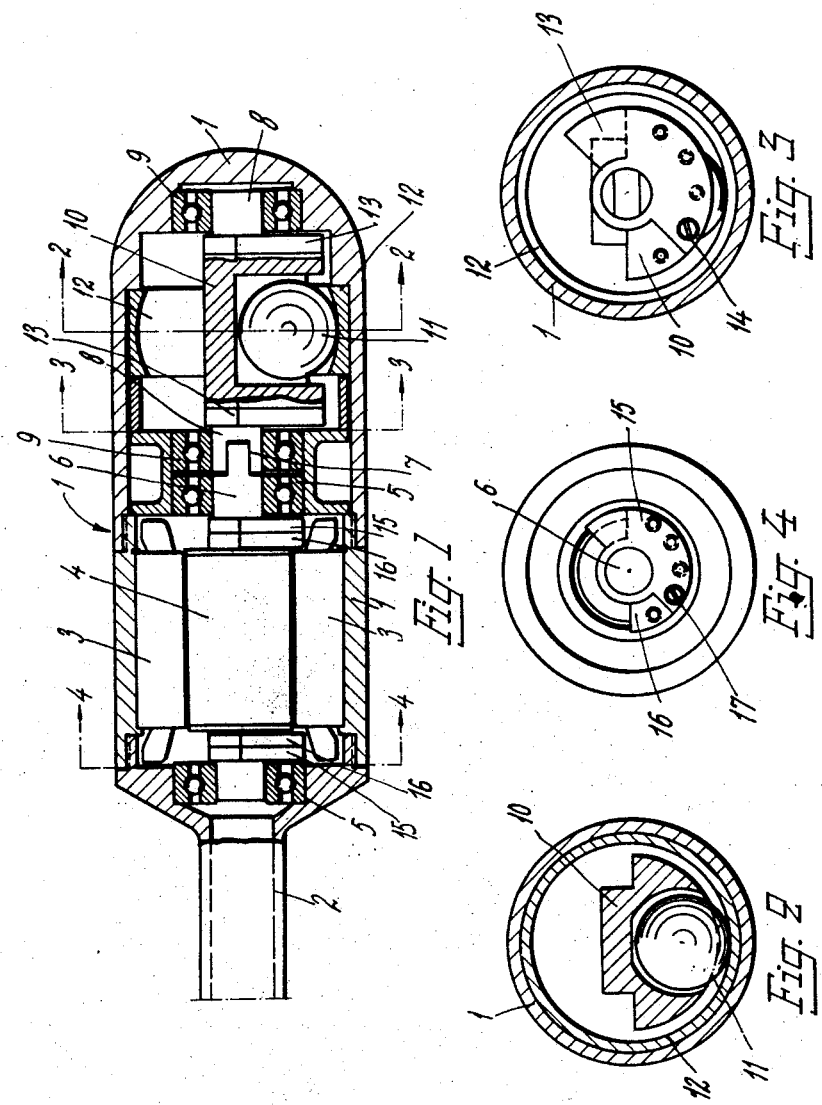

VIBRATORS, MORE PARTICULARLY AN IMMERSION VIBRATOR

Sven-Åke Nordegren, Ljungby, Sweden, assignor to Aktiebolaget Vibro-Verken, Stockholm, Sweden, a corporation of Sweden Filed Nov. 6, 1956, Ser. No. 620,759

Claims priority, application Sweden Nov. 11, 1955

5 Claims. (Cl. 310—81)

The present invention relates to vibrators, particularly immersion vibrators, having a large output, that is to say, a large centrifugal force and vibration amplitude, and of the type comprising a driving motor having a stator and a rotor, and a vibration generator driven by said motor and capable of generating rotary vibrations of a frequency directly corresponding to the speed of the driving motor. The vibration generator is connected to the stator of the driving motor in such a way that the latter is compelled to participate in the oscillatory movements of the vibration generator and transmit said movements in its turn to the rotor through the rotor bearings.

In vibrators of this type which usually have the driving motor and vibration generator enclosed in a common casing, or supported by a common more or less freely oscillating stand, it is obvious that the rotor bearings of the driving motor are subjected to appreciable stresses since the rotor serves as a vibration-damping mass. Moreover, in consequence of its rotation, the rotor exhibits a marked gyrostatic effect.

The present invention has for its main object to provide for a reduction of the load on the rotor bearings in such vibrators, in which the said rotor, as described, is not directly influenced by the vibrations generated, and at the same time to provide for an increased output of the vibrator by eliminating the damping of the vibrations caused by the rotor.

The vibrator according to the invention is mainly characterized by the fact that the rotor of the driving motor has an eccentric centre of gravity which is preferably produced by means of separate adjustable eccentric weights mounted on the motor shaft, the displacement of the rotor's centre of gravity being of such a nature that the rotor itself will be caused to vibrate substantially synchronously and in phase with the stator on which the vibration generator acts. In other words, the rotor is caused to execute a rotary vibratory movement which is essentially in accordance with that of the stator, whereby the pressure at the rotor bearings will be substantially constant and independent of the vibratory movements.

The invention is of special value in such vibrators of the type referred to which are equipped with a vibration generator comprising a rotary driver directly coupled to the rotor of the driving motor. The driver, which may be balanced in itself, is adapted to impart to a preferably spherical rolling body a rolling movement along a circular roller track which surrounds the driver shaft and is rigidly connected to the stator of the driving motor. The invention may, however, also be applied in cases where the vibration generator comprises an unbalanced rotary vibrator element which is connected to the rotor of the driving motor in such a way that vibrations can scarcely be transmitted directly to the motor rotor, the vibrator element being in this case mounted in bearings separated from the rotor bearings so that the vibrations generated are mainly transmitted to a part of the vibration generator which is rigidly connected to the stator of the driving motor.

To facilitate understanding of the invention, a preferred embodiment thereof will now be described, the invention being, however, not limited to this particular form. The form of construction which has been illustrated in the accompanying drawing represents an immersion vibrator with a large output and vibration amplitude, said vibrator being mainly intended to be used for heavy concrete work, such as dam building. In the drawing Fig. 1 is a longitudinal section through the active part of the vibrator, while Figs. 2, 3 and 4 show crosssections taken along the lines 2—2, 3—3 and 4—4 in Fig. 1.

The vibrator illustrated consists of an outer casing or stator body 1 divided into a number of sections and mounted at the end of a long tubular shaft 2, the other end of which is provided with a handle (not shown). The shaft 2 encloses the necessary electric conductors for feeding the vibrator. Next to the shaft 2 an electric motor is mounted in the casing 1, the stator 3 of which is rigidly connected to the stator body 1, its rotor 4 being supported in rotor bearings 5 arranged in the casing. The rotor shaft 6 is chisel-shaped at its end remote from the shaft 2 and projects into a diametrical groove 7 in the end of an adjoining driver shaft 8 which is placed in the extension of the rotor shaft 6 and supported by driver bearings 9 separated from the rotor bearings 5. The chisel-shaped end of the rotor shaft 6 forms a type of claw coupling together with the diametrical groove 7 in the driver shaft 8, which enables the rotor 4 to drive the driver shaft 8 directly, but in general prevents the transmission of all other than purely rotary movements between the two shafts 6 and 8.

The driver shaft 8 is formed with a substantially bowlshaped attachment approximately in the middle of its length which attachment surrounds a heavy ball 11 rolling on a circular roller track 12 on the rotation of the driver shaft. The roller track 12 is rigidly connected to the stator body 1 and in consequence of the rolling movement of the ball 11 both the roller track and casing 1 and therefore the stator 3 of the driving motor are set in rotary oscillating movement or vibration.

The attachment 10 might be balanced in relation to the driver shaft 8 but in order to increase the amplitude of the vibrations generated it has been found preferable to provide the two ends of the driver 10 with adjustable eccentric weights 13 and construct the attachment 10 in such a way that it is unbalanced in itself and has its centre of gravity displaced in a direction towards the point on the roller track against which the ball 11 lies (see Fig. 2). By means of the adjustable eccentric weights 13, which with the help of screws 14 or the like can be locked in different angular positions, it is possible to vary the unbalance of the whole driver as desired so that the vibrator's amplitude can be changed within certain limits.

It is obvious that in the form of construction shown, the rotor 4 of the driving motor will exert a damping effect upon the work of the vibrator, not least owing to its gyrostatic effect, since on account of the rigid connection of the motor stator 3 with the strongly vibrating roller track 12 and the bearings 9 for the unbalanced driver, the vibrating parts will also tend to impart a corresponding vibratory movement to the rotor 4. This would result in an appreciable load on the rotor bearings 5, if no special measures were taken, and therefore, the rotor shaft 6 of the driving motor is provided, as shown, with adjustable eccentric weights 15 and 16 at its two ends. With the help of the adjustable eccentric weights which can be mutually locked in the desired positions by the screws 17 or like locking members, it is also possible to impart a vibratory movement to the rotor 4 which is synchronous and in phase with that of the stator 3 and the vibratory movement of the other vibrator parts. In this way not only is the load on the rotor bearings 5 reduced, but at the same time the vibration-damping property of the rotor is eliminated so that the total vibratory output is increased.

It is clear that the eccentric weights 15 and 16 may also be used to distribute the amplitude along the entire length of the immersion vibrator. Owing to the unbalance of the driver in the vibration-generating part of the vibrator, a similar reduction of the load on the bearings 9 is, of course, also obtained, but this does not become apparent in the same way, since in the endeavour to obtain high amplitudes in general, it is preferable to considerably overdimension the eccentric weights 13 of the driver and in this way increase the maximum vibration amplitude of the vibrator as a whole. The distribution of the amplitude in the vibrator may also be changed with the help of the eccentric weights 13.

It is not necessary, of course, to employ adjustable eccentric weights as shown, since the desired displacement of the centre of gravity of the driving motor's rotor can, of course, also be obtained by making the rotor itself unbalanced, and insofar as the driver 10 is balanced it can obviously be rigidly connected to the driving motor's rotor 4 so that, together with the rotor, the driver 10 forms a rigid rotating unit which is only supported in two bearings. In such cases too, the driver may be provided with small eccentric weights so that it is caused to vibrate synchronously and in phase with the intentionally unbalanced rotor.

What I claim is:

1. In a vibrator, the combination of a driving motor comprising a stator member and a rotor, said rotor having a shaft journaled in bearings supported by said stator member, and a vibration generator unit driven by said motor and capable of generating rotary vibrations of a frequency determined by the speed of said driving motor, said vibration generator unit comprising a rotary driver mechanically coupled to said rotor of the driving motor, a stator body, and a circular roller track located within the stator body of said vibration generator unit and rigidly connected thereto, a rolling body being imparted a rolling movement along said track by means of said rotary driver, said stator body of the vibration generator unit being rigidly connected to the stator member of the driving motor so that said stator member is compelled to participate in the oscillatory movements of the vibration generator unit, the center of gravity of said rotor of the driving motor being eccentrically displaced in such a manner that the rotor itself during its rotation will be caused to oscillate substantially in synchronism and in phase with said stator member and said vibration generator unit rigidly connected thereto to reduce stresses on the rotor bearings and damping of the vibrations by the rotor.

2. A vibrator as defined in claim 1, wherein bearings journal the rotary driver in the stator body, the driver being unbalanced to cause oscillation of the driver substantially in synchronism and in phase with the stator body to reduce stresses on the driver bearings.

3. A rotary vibrator comprising a driving motor including a stator and a rotor, bearings supported in fixed relation to the stator to journal the rotor for rotation relative to the stator, vibration generating means including a stator body and a rotary element transmitting vibrations to the stator body when rotating, means coupling said motor rotor to the rotary element to rotate it and generate vibrations of the stator body of a frequency determined by the speed of the driving motor, said coupling means preventing direct transmission of the vibrations of the rotary element to the motor rotor, means rigidly connecting the motor stator to the stator body, whereby the motor stator oscillates in accordance with the vibration generating means, and means unbalancing the motor rotor to cause oscillation of the rotor substantially in synchronism and in phase with the motor stator to reduce stresses on the rotor bearings and damping of the vibrations by the rotor.

4. A vibrator as defined in claim 3, in which adjustable eccentric weights are mounted on the rotor to displace eccentrically the center of gravity thereof.

5. A vibrator as defined in claim 3, in which the rotary element of the vibration generator includes an unbalanced member directly mechanically coupled to the driving motor rotor, and bearings independent of the rotor bearings to support the unbalanced rotary member.

References Cited in the file of this patent

UNITED STATES PATENTS

| 1,927,075 | Thomas | Sept. 19, 1933 |
| 1,947,941 | Jackson | Feb. 20, 1934 |
| 2,116,708 | Niekamp | May 10, 1938 |
| 2,360,803 | Steverman | Oct. 17, 1944 |
| 2,829,529 | Fleming | Apr. 8, 1958 |

FOREIGN PATENTS

| 163,656 | Australia | June 27, 1955 |
| 256,063 | Switzerland | Feb. 16, 1949 |
| 259,357 | Switzerland | June 16, 1949 |
| 750,956 | France | June 12, 1933 |